(12) United States Patent
Finn

(10) Patent No.: US 10,068,047 B1
(45) Date of Patent: Sep. 4, 2018

(54) SYSTEMS AND METHODS FOR DESIGNING AN INTEGRATED CIRCUIT

(71) Applicant: Altera Corporation, San Jose, CA (US)

(72) Inventor: Simon Finn, High Wycombe (GB)

(73) Assignee: Altera Corporation, San Jose, CA (US)

( * ) Notice: Subject to any disclaimer, the term of this patent is extended or adjusted under 35 U.S.C. 154(b) by 69 days.

(21) Appl. No.: 15/293,725

(22) Filed: Oct. 14, 2016

(51) Int. Cl.
   *G06F 17/50* (2006.01)

(52) U.S. Cl.
   CPC ...... *G06F 17/5077* (2013.01); *G06F 2217/06* (2013.01)

(58) Field of Classification Search
   USPC .......................................................... 716/126
   See application file for complete search history.

(56) References Cited

U.S. PATENT DOCUMENTS

| | | |
|---|---|---|
| 6,102,964 A | 8/2000 | Tse et al. |
| 7,120,883 B1 | 10/2006 | Antwerpen et al. |
| 2002/0113619 A1* | 8/2002 | Wong ............... H03K 19/17736 326/41 |
| 2014/0359755 A1* | 12/2014 | Beitel .................. G06F 21/572 726/18 |

* cited by examiner

*Primary Examiner* — Bryce Aisaka

(57) ABSTRACT

A method of designing an integrated circuit using a computer implemented circuit design application is disclosed. The method may involve receiving a user-provided value specifying a number of output components to be connected to an input component in the integrated circuit, connecting the input component to each output component of the number of output components in the integrated circuit using computer-implemented fan-out circuit blocks. In addition, generating a circuit design such that one of the fan-out circuit blocks is replaced in the circuit design with connecting components according to a set of parameters.

22 Claims, 7 Drawing Sheets

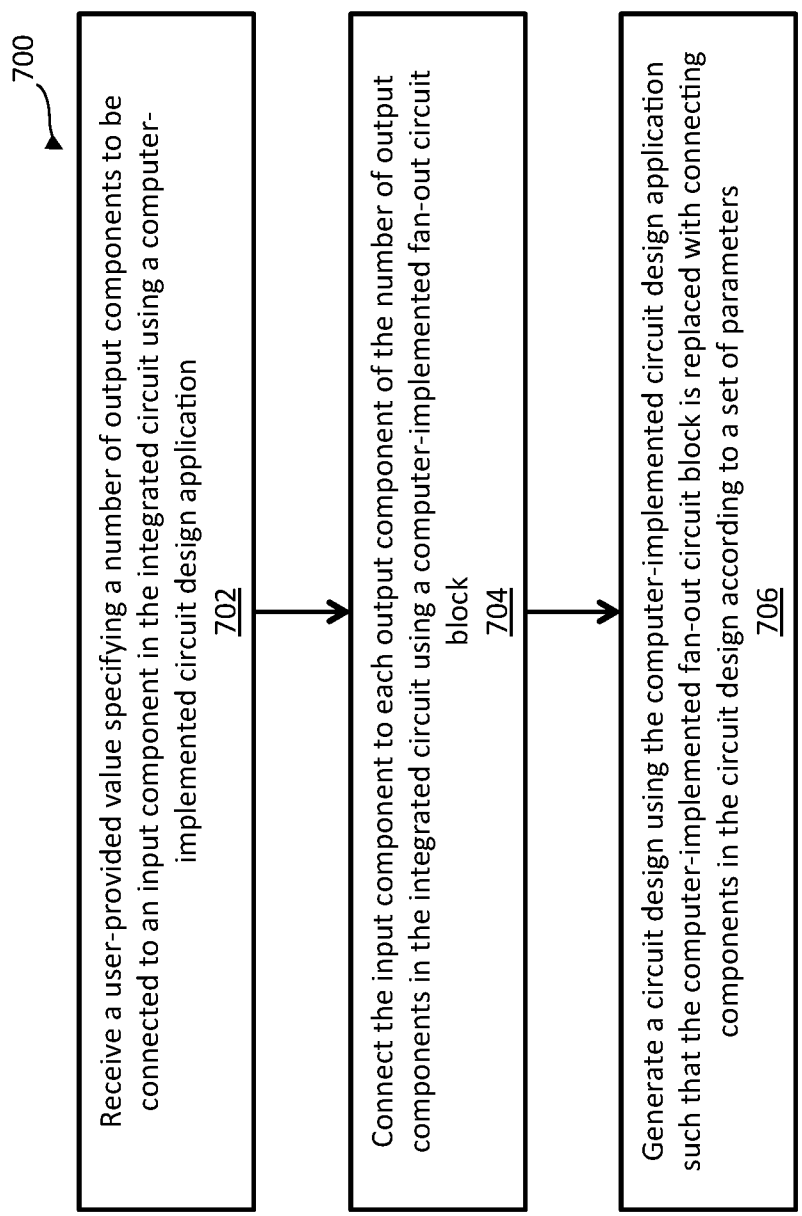

SYSTEMS AND METHODS FOR DESIGNING AN INTEGRATED CIRCUIT

FIELD OF THE DISCLOSURE

The present disclosure relates to electronic circuits, and more particularly, to systems and methods for designing an integrated circuit.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Electronic design automation (EDA) tools or applications are generally used by circuit developers to design integrated circuits (ICs). An IC may include many blocks of logic circuitry, registers, memory blocks, input/output (I/O) blocks, etc. These blocks may be configurable to perform different tasks. A generic routing or interconnection structure is typically used to connect the various blocks and circuitries within the IC in different ways. All these configurations are usually done using an EDA tool.

Designing an IC on an EDA tool generally includes, among others, synthesizing and translating the register transfer level (RTL) description of the circuit into a discrete netlist of logic-gate primitives, placing and routing the many components of the synthesized gate-level netlist, and analyzing and simulating the IC design. Routing an FPGA circuit design can be particularly difficult. In digital electronics, the fan-out of a logic gate output is the number of gate inputs connected to a logic gate output. The interconnect circuitry of the FPGA is highly buffered, which leads to a significant number of timing critical, high fan-out nets. Solutions such as register pipelining have been proposed to reduce high fan-out and further increase the performance. During register pipelining, additional registers are inserted between synchronous elements, which lead to an increase in latency at the benefit of increased clock frequencies and throughput. However, performing register pipelining often involves spending significant time and effort because several iterations of locating performance bottlenecks, inserting or removing registers, and compiling the modified integrated circuit design are usually required.

SUMMARY

Embodiments described herein include a method of generating an authentication signature and an integrated circuit for generating an authentication signature. It should be appreciated that the embodiments can be implemented in numerous ways, such as a process, an apparatus, a system, a device, or a method. Several embodiments are described below.

In one embodiment, a method of designing an integrated circuit is disclosed. The method may include an operation to receive a user-provided value specifying a number of output components to be connected to an input component in the integrated circuit using a computing-implemented circuit design application. The input component and output components are components of the integrated circuit. The method may also include an operation to connect the input component to each output component of the number of output components in the integrated circuit using a computer-implemented fan-out circuit block. The method may further include an operation to generate a circuit design using the computer-implemented circuit design application. The computer-implemented fan-out circuit block is replaced with connecting components in the circuit design according to a set of parameters. The set of parameters comprises an implementation platform, a maximum number of output components allowed to be connected to the input component, and a latency value.

The method may include an operation to replace the computer-implemented fan-out circuit block with the connecting components, which may further include an operation to insert a series of connecting wires between the input component and each output component using the fan-out circuit block. The method may also include an operation to insert at least one routing register between the input component and each output component using the fan-out circuit block.

In another embodiment, a non-transitory computer-readable storage medium is disclosed such that the non-transitory computer-readable storage medium is operable to store one or more sequences of instructions, which instructions, when executed by one or more processors, causes the one or more processors to design an integrated circuit. The one or more sequences of instructions may include instructions to receive a user-provided value specifying a number of output components to be connected to an input component in the integrated circuit using a circuit design application. The input component and output components are components of the integrated circuit. The one or more sequences of instructions may include instructions to connect the input component to each output component of the number of output components in the integrated circuit using a fan-out circuit block. The one or more sequences of instructions may include instructions to generate a circuit design using the circuit design application. The fan-out circuit block is replaced with connecting components in the circuit design according to a set of parameters. The set of parameters comprises an implementation platform, a maximum number of output components allowed for the input component, a latency value, and the number of output components.

In an embodiment, a hardware description language (HDL) module of a computer-implemented circuit design application is disclosed. The HDL module may further include a fan-out circuit block generated by the computed-implemented circuit design application. The fan-out circuit block has one input port such that the one input port is connected to an input component of an integrated circuit. Furthermore, the fan-out circuit block has a user-specified number of output ports such that each of the output ports is connected to an output component of the integrated circuit.

Further features of the invention, its nature, and various advantages will be more apparent from the accompanying drawings and the following detailed description of the preferred embodiments.

BRIEF DESCRIPTION OF THE DRAWINGS

In the drawings:

FIG. 7 illustrates an exemplary method to connect components in an integrated circuit in accordance with an embodiment of the present invention.

DETAILED DESCRIPTION OF THE DRAWINGS

Embodiments of the present invention relate to integrated circuits with logic circuitry. The integrated circuits may be any suitable type of integrated circuit, such as microprocessors, application-specific integrated circuits, digital signal processors, memory circuits, or other integrated circuits. If desired, the integrated circuits may be programmable integrated circuits that contain programmable logic circuitry. The present invention will generally be described in the context of integrated circuits such as programmable logic device (PLD) integrated circuits as an example. In the following description, the terms 'circuitry' and 'circuit' are used interchangeably.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of other features. However, any individual feature may not address any of the problems discussed above or might only address one of the problems discussed above. Some of the problems discussed above might not be fully addressed by any of the features described herein.

Figure 1:
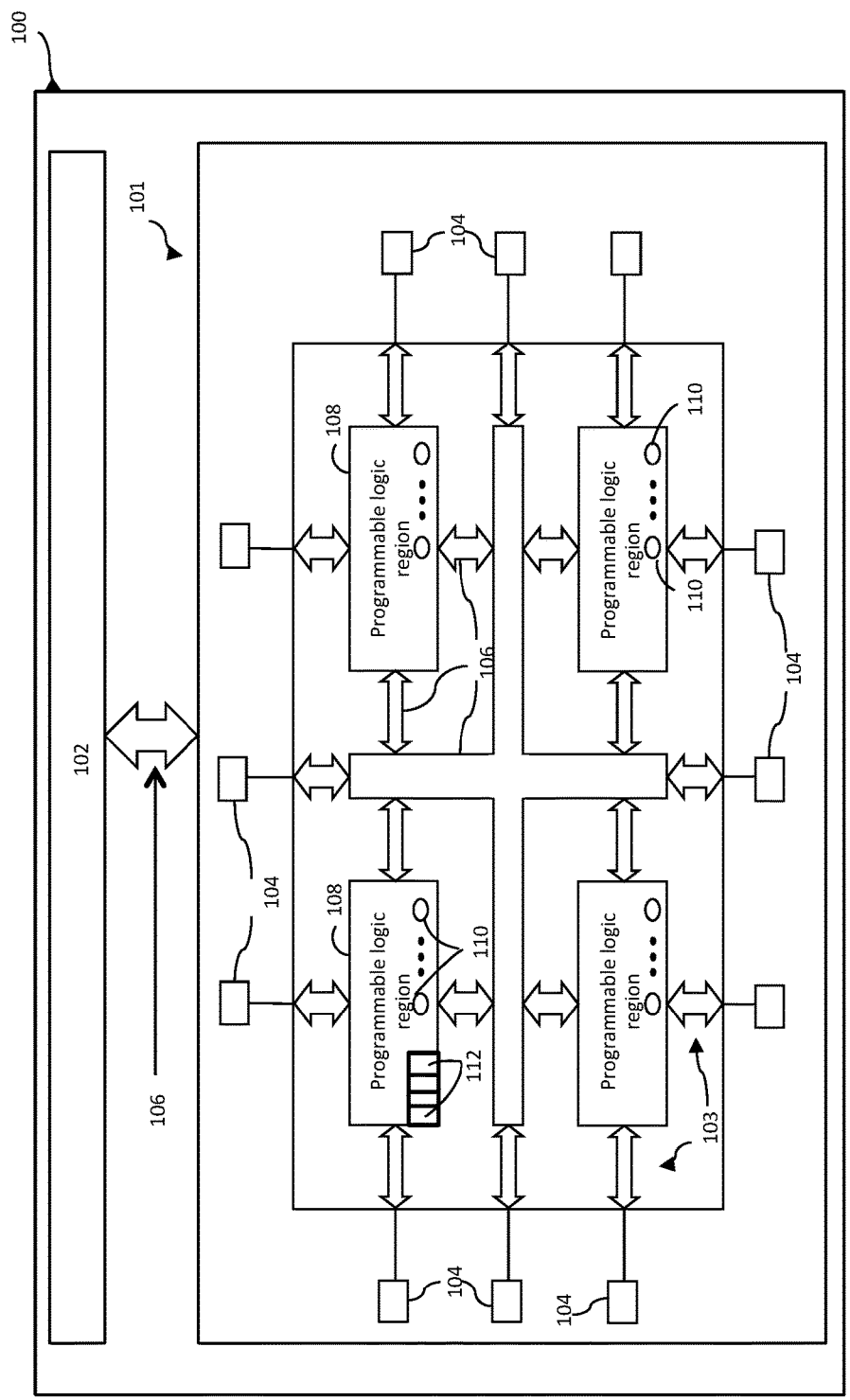
FIG. 1 illustrates an exemplary integrated circuit in accordance with an embodiment of the present invention.

FIG. 1 illustrates an example integrated circuit 100 in accordance with an embodiment of the present invention. In FIG. 1, integrated circuit 100 may include processing circuitry 102 communicatively coupled to a programmable logic device (PLD) circuit 101 via interconnection circuitry 106. Processing circuitry 102 may be a central processing unit (CPU), a microprocessor, a floating-point coprocessor, a graphics coprocessor, a hardware controller, a network controller, a Reduced Instruction Set Computing (RISC) based processor such as an Acorn RISC Machine (ARM) processor, or other processing unit. PLD circuit 101 may include input-output circuitry 103 for driving signals off of PLD circuit 101 and for receiving signals from other devices via input-output pins 104. Interconnect circuitry 106 may include interconnection resources such as global and local vertical and horizontal conductive lines and buses may be used to route signals on PLD circuit 101. The interconnect circuitry 106 includes conductive lines and programmable connections between respective conductive lines and is therefore sometimes referred to as programmable interconnects.

The interconnect circuitry 106 may form a network-on-chip (NOC). A NOC may be a system of interconnect resources such as multiplexers and de-multiplexers that applies general networking technologies to connect the processing circuitry 102 with PLD circuit 101 and to route signals on PLD circuit 101. The NOC may perform network communication functions. For example, the NOC may perform routing functions, gateway functions, protocol or address translation, and security functions.

PLD circuit 101 may include programmable logic regions 108 that can be configured to perform a custom logic function. Each programmable logic region 108 may include combinational and sequential logic circuitry. The interconnect circuitry 106 may be considered to be a type of programmable logic 108.

PLD circuit 101 may also contain programmable memory elements 110. Programmable memory elements 110 can be loaded with configuration data (also called programming data) using pins 104 and input-output circuitry 103. Once loaded, the programmable memory elements 110 may each provide a corresponding static control signal that controls the operation of an associated logic component in programmable logic 108. In a typical scenario, the outputs of the loaded programmable memory elements 110 are applied to the gates of metal-oxide-semiconductor transistors in programmable logic 108 to turn certain transistors on or off and thereby configure the logic in programmable logic region 108 and routing paths. Programmable logic circuit elements that may be controlled in this way include pass transistors, parts of multiplexers (e.g., multiplexers used for forming routing paths in interconnect circuitry 106), look-up tables, logic arrays, various logic gates, etc.

Programmable memory elements 110 may be implemented using any suitable volatile and/or non-volatile memory structures such as random-access-memory (RAM) cells, fuses, antifuses, programmable read-only-memory memory cells, mask-programmed and laser-programmed structures, resistive memory structures, combinations of these structures, etc. Because programmable memory elements 110 are loaded with configuration data during programming, programmable memory elements 110 are sometimes referred to as configuration memory, configuration RAM (CRAM), or programmable memory elements.

The circuitry of PLD circuit 101 may be organized using any suitable architecture. As an example, the logic of PLD circuit 101 may be organized in a series of rows and columns of larger programmable logic regions 108 each of which contains multiple smaller logic blocks 112. The smaller logic blocks may be, for example, regions of logic that are sometimes referred to as logic elements (LEs), each containing a look-up table (LUT), one or more registers, and programmable multiplexer circuitry. The smaller regions may also be, for example, regions of logic that are sometimes referred to as adaptive logic modules (ALMs). Each adaptive logic module may include a pair of adders, a pair of associated registers and a look-up table or other block of shared combinational logic (as an example). The larger regions may be, for example, logic array blocks (LABs) containing multiple logic elements or multiple ALMs. In the example of FIG. 1, illustrative smaller logic blocks 112 (which may be, for example, LEs or ALMs) are shown in one of the larger regions of programmable logic 108 in FIG. 1 (which may be, for example, a logic array block). In a typical PLD circuit 101, there may be hundreds or thousands of smaller logic blocks 112. The smaller logic blocks 112 that are shown in FIG. 1 are merely illustrative.

During device programming, configuration data that configures the smaller logic blocks 112 and programmable logic regions 108, so that their logic resources perform desired logic functions on their inputs and produce desired output signals, is loaded into PLD circuit 101. For example, CRAM cells are loaded with appropriate configuration data bits to configure adders and other circuits on PLD circuit 101 to implement desired custom logic designs.

The resources of PLD circuit 101, such as programmable logic 108, may be interconnected by programmable interconnects 106. Programmable interconnects 106 generally include vertical and horizontal conductors. These conductors may include global conductive lines that span substantially all of device 101, fractional lines such as half-lines or quarter lines that span part of PLD circuit 101, staggered lines of a particular length (e.g., sufficient to interconnect several logic array blocks or other such logic areas), smaller local lines, or any other suitable interconnection resource arrangement. If desired, the logic of PLD circuit 101 may be arranged in more levels or layers in which multiple large regions are interconnected to form still larger portions of logic. Still other device arrangements may use logic that is not arranged in rows and columns.

In addition to the relatively large blocks of programmable logic that are shown in FIG. 1, PLD circuit 101 generally also includes some programmable logic associated with the programmable interconnects, memory, and input-output circuitry on PLD circuit 101. For example, input-output circuitry 103 may contain programmable input and output buffers. Programmable interconnects 106 may be programmed to route signals to a desired destination.

Figure 2:
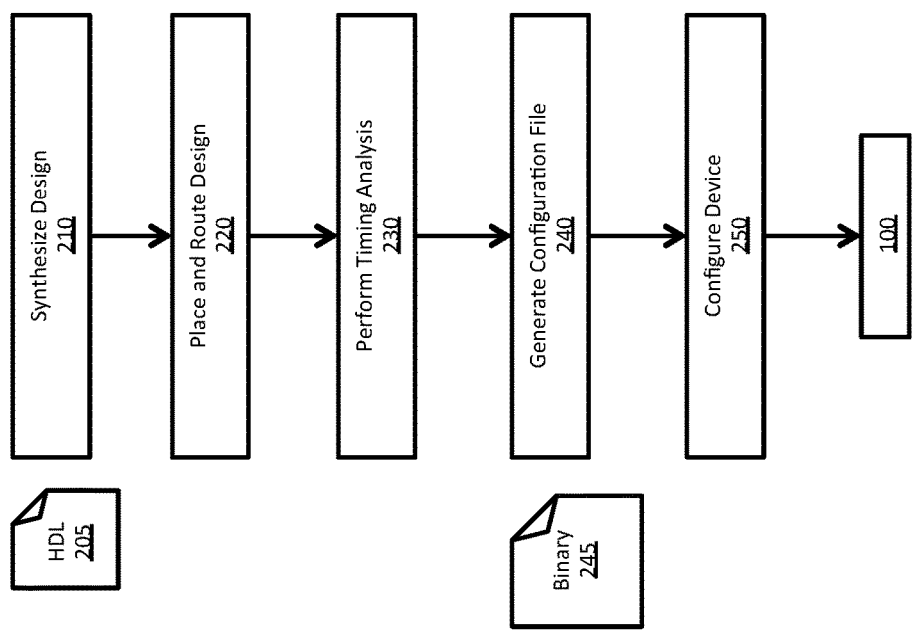
FIG. 2 illustrates an exemplary method to create and compile a circuit design for an integrated circuit using an electronic design assistant (EDA) tool in accordance with embodiments of the present invention.

FIG. 2 depicts illustrative steps for compiling a circuit design for an integrated circuit using an EDA tool in accordance with embodiments of the present invention. Generally, a circuit designer or engineer may create a circuit design for an integrated circuit, for example integrated circuit 100, that is embodied in a hardware description language (HDL) file 205. It should be noted that even though HDL file 205 is shown in FIG. 2, other design input techniques (e.g., input files using other high-level languages, the Open Computing Language (OpenCL) framework, or compilation output based on various models, etc.) may be applicable in this context. The circuit design may be created using the EDA tool or may be provided by the user as an input to the EDA tool.

At step 210, HDL file 205 may be synthesized by the EDA tool. For instance, the synthesis operation performed at step 210 may translate the circuit design embodied in HDL file 205 into a discrete netlist of logic-gate primitives. The synthesized logic gates in the circuit design are then placed and routed on a target integrated circuit 100 at step 220.

Placement is a step in electronic design automation—the portion of the physical design flow that assigns exact locations for various circuit components within integrated circuit 100. An inferior placement assignment will not only affect the chip's performance but might also make it unable to be manufactured by producing excessive wire-length, which is beyond available routing resources. Consequently, a placement tool or placer must perform the assignment while optimizing a number of objectives to ensure that a circuit meets its performance demands. Typical placement objectives include total wire-length, timing, congestion, and power, as described below.

Total wire-length: Minimizing the total wire-length, or the sum of the length of all the wires in the design, is the primary objective of most existing placers. This not only helps minimize chip size, and hence cost, but also minimizes power and delay, which are proportional to the wire-length.

Timing: The clock cycle of a chip is determined by the delay of its longest path, usually referred to as the critical path. Given a performance specification, a placer must ensure that no path exists with delay exceeding the maximum specified delay.

Congestion: While it is necessary to minimize the total wire-length to meet the total routing resources, it is also necessary to meet the routing resources within various local regions of the chip's core area. A congested region might lead to excessive routing detours, or make it impossible to complete all routes.

Power: Power minimization typically involves distributing the locations of cell components to reduce the overall power consumption, alleviate hot spots, and smooth temperature gradients.

Routing adds wires or registers needed to properly connect the placed components while obeying all design rules for the IC. The task of all routing programs, sub-routines, or modules (also called routers) is to connect components as specified in a netlist according to design objectives. Routing programs are provided some pre-existing polygons consisting of pins (also called terminals) on cells, and optionally some pre-existing wiring called pre-routes. Each of these polygons is associated with a conductor that interconnects two or more component terminals (also called a net), usually by name or number. The primary task of the router is to create geometries such that all terminals assigned to the same net are connected, no terminals assigned to different nets are connected, and all design rules are obeyed.

A router can fail by not connecting terminals that should be connected (an open), by mistakenly connecting two terminals that should not be connected (a short), or by creating a design rule violation. In addition, to correctly connect the nets, routers may also be expected to make sure the design meets timing, has no crosstalk problems, meets any metal density requirements, does not suffer from antenna effects, and so on. This long list of conflicting objectives is what makes routing extremely difficult.

After the place and route operation, at step 230, a timing analysis tool (e.g., the EDA tool may include a built-in timing analyzer) may perform a timing analysis operation on the circuit design. It should be appreciated that the timing analysis operation may compute the lengths of different paths in the circuit design and the timing constraints of the overall circuit design. The EDA tool may then generate binary configuration file 245 at step 240. Binary configuration file 245 contains a description of the circuit design and may be used to configure or program the targeted integrated circuit 100 (e.g., contents of binary configuration file 245 are loaded onto integrated circuit 100) at step 250. Alternatively, binary configuration file 245 may contain a description to produce IC masks that can then be used to fabricate the targeted integrated circuit 100.

Figure 3:
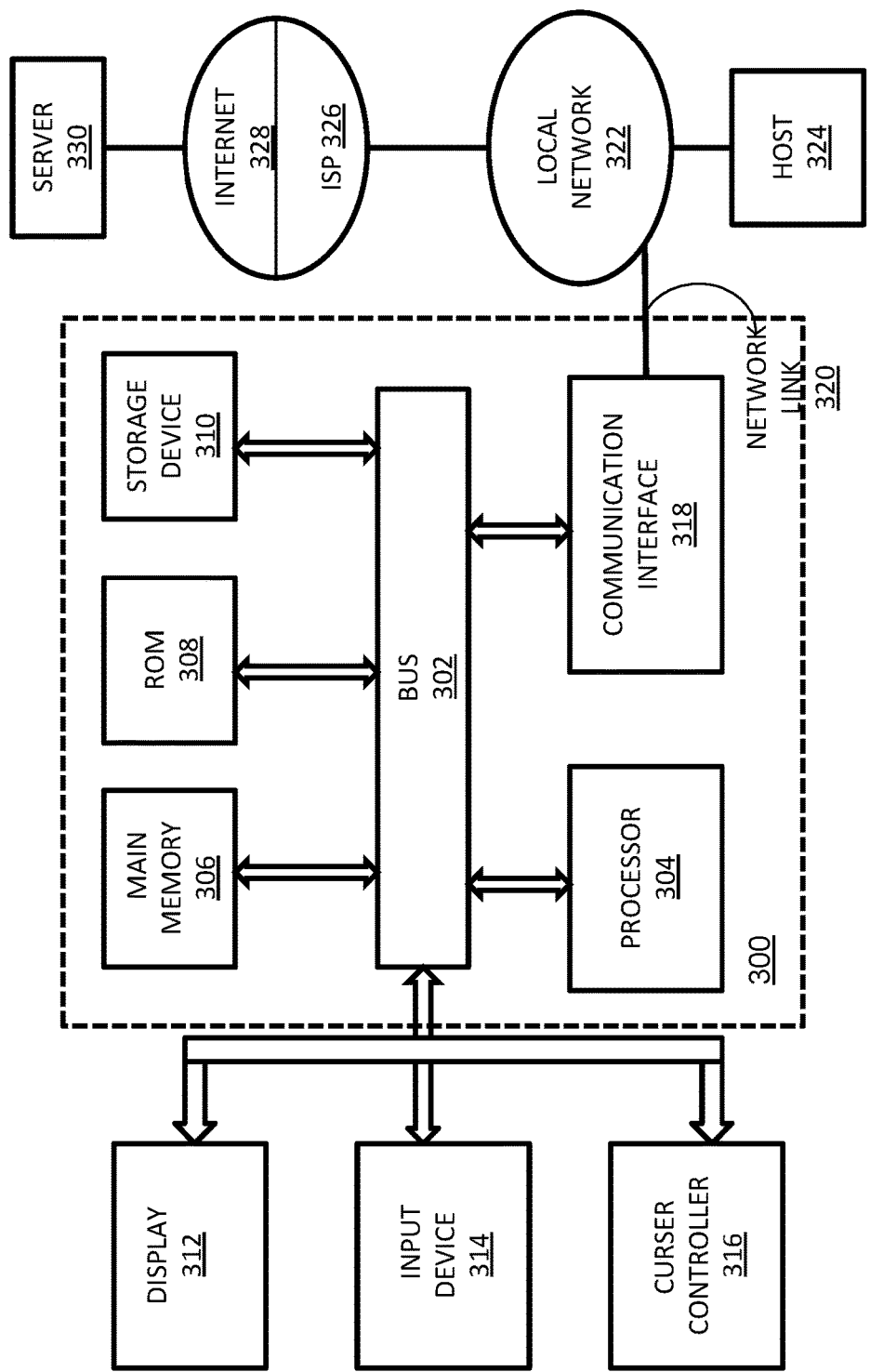
FIG. 3 illustrates an exemplary computer system upon which an EDA tool may be implemented in accordance with an embodiment of the present invention.

FIG. 3 is a block diagram that illustrates a computer system 300 in accordance with an embodiment of the present invention. In an embodiment, the EDA tool of FIG. 2 may be implemented on a computer system 300. Computer system 300 may include a bus 302 or other communication mechanism for communicating information, and a hardware processor 304 coupled with bus 302 for processing information. Hardware processor 304 may be, for example, a general-purpose microprocessor. In an embodiment, processor 304 may be similar to processing circuitry 102 described above.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to processor 304. Another type of user input device is cursor controller 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

In an embodiment, computer system 300 may receive code for processing. The received code may be executed by processor 304 as it is received, and/or stored in storage device 310, or other non-volatile storage for later execution.

Figure 4:
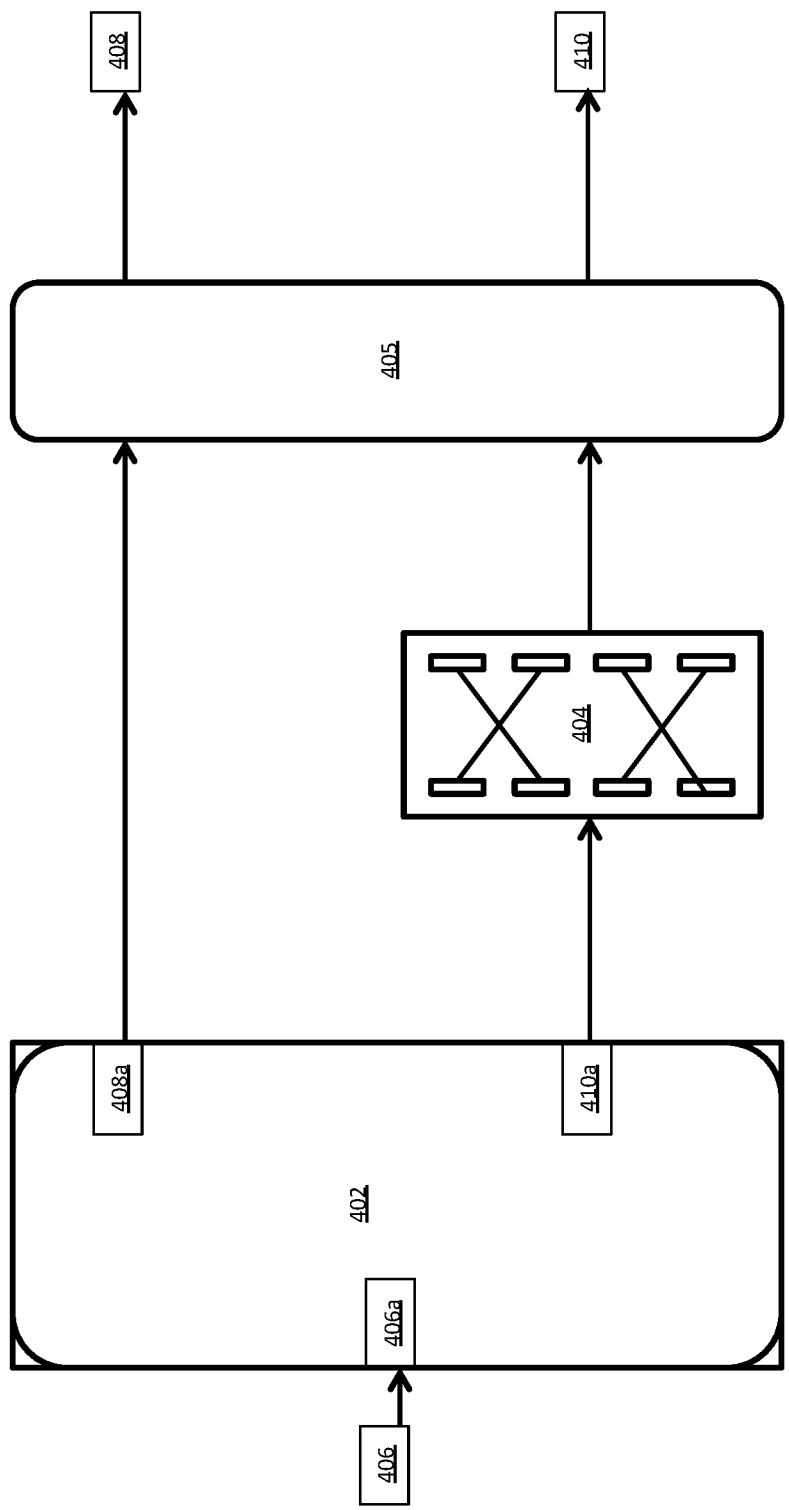
FIG. 4 illustrates an exemplary fan-out circuit block in accordance with an embodiment of the present invention.

FIG. 4 illustrates an exemplary fan-out circuit block in accordance with an embodiment of the present invention. For the purpose of illustrating clear examples, FIG. 4 will be discussed in reference to integrated circuit 100 of FIG. 1, the design flow of integrated circuit 100 discussed in FIG. 2, and computer system 300 of FIG. 3.

There are several issues associated with the placement and routing steps described in reference to FIG. 2. The placement and routing programs used are blind to the platform specifications, maximum number of outputs allowed for particular components, and other criteria that a human designer may take into account while placing and routing components. For example, two components that are located far away from one another on integrated circuit 100 can be connected by either using two very long wires or sixty four short wires. The EDA tool of FIG. 2 in implementing place and route design step 220 has an objective to reduce fan-out and therefore may only take into account the number of conductors or wires used in connecting two components. The EDA tool may conclude that connecting two far off components with two long wires is more efficient even though it may lead to higher latency and lower overall system performance.

Similarly, the EDA tool is also blind to the platform floor plan. Regardless of the type of integrated circuit 100 being designed, the EDA tool may use register pipelining to increase or decrease latency. Register pipelining refers to the process of inserting or removing a register between components of an integrated circuit design. For instance, inserting a register between two synchronous components of an integrated circuit design increases the latency between those two synchronous components for the benefit of potentially increased clock frequencies and throughput. Register pipelining is a complicated design optimization method that may be very time consuming and expensive to implement. Therefore, it would be desirable to automate the process of register pipelining during placement and routing steps (and all other steps) in the circuit design process by making the EDA tool of FIG. 2 take into account a number of different parameters before register pipelining.

Referring now to FIG. 4, fan-out circuit block 402 is communicatively coupled to selector 404. In an embodiment, fan-out block 402 is an HDL module that is implemented as a part of an EDA tool described in FIG. 2. For example, fan-out circuit block 402 may be a GUI element to illustrate a connection between an input component of integrated circuit 100 and one or more output components of integrated circuit 100. In an embodiment, fan-out circuit block 402 may be a vectorized fan-out circuit block. A vectorized fan-out circuit block may accept vectorized input signals. Fan-out circuit block 402 may be a software construct that hides the low level processing decisions, instructions, and design choices by an EDA tool to connect components while designing integrated circuit 100. In an embodiment, fan-out circuit block 402 receives an input signal from input component 406 at input port 406a. In an embodiment, the input signal may be addresses for output components 408 and 410 to connect input component 406 to output components 408 and 410. In an embodiment, the input signal may include a control signal to control selector 404 or multiplexer 405. In an embodiment, the control signal determines the appropriate output signal lines that may be asserted by selector 404 or multiplexer 405 to connect input component 406 to output components 408 and 410. Input component 406 may be a component of integrated circuit 100 as describe above. For example, input component 406 may be processing circuitry 102, a phase locked loop (PLL) circuit, digital signal processing circuitry, or other integrated circuit 100 components. In an embodiment, input component 406 may send a vectorized input signal to a vectorized fan-out circuit block. In an embodiment, each component signal of the vectorized input signal may be a signal from a different input component.

In an embodiment, the input signal is forwarded to both of the output ports 408a and 410a of circuit block 402. In an embodiment, output ports 408a and 410a are software representations of output components 408 and 410, respectively, such that a representative connection between input port 406a and output ports 408a and 410a through fan-out circuit block 402 is expanded into a physical connection using wires or registers between input component 406 and output components 408 and 410. In an embodiment, at least one of output ports 408a and 410a of fan-out circuit block 402 is connected to selector 404. In an embodiment, at least one of output ports 408a and 410a of fan-out circuit block 402 is connected to multiplexer 405. In an embodiment, selector 404 comprises a de-multiplexer that asserts an output line based on the input signal and connects input component 406 to an output component. In another embodiment, selector 404 comprises a crossbar switch that connects input component 406 to an output component based on the input signal generated by input component 406.

For example, input component 406 may be processing circuitry 102 as described above that is to be connected to output components 408 and 410, which may be memory elements 110 as describe above. Input component 406 sends an input signal to fan-out circuit block 402, which is received at input port 406a. The input signal is forwarded to output ports 408a and 410a. I an embodiment, output port 410a may forward the input signal to selector 404, and output port 408a may forward the input signal to multiplexer 405. Selector 404 and multiplexer 405 may assert the appropriate output lines to connect input component 406 to output components 408 and 410, respectively. Similarly, input component 406 may be multiple processing elements (for example multiple processors) each of which is similar to processing circuitry 102 described above. Input component 406 is to be connected to output components 408 and 410, which may be memory arrays such that each memory block in the memory arrays is a memory element 110 as describe above. Input component 406 sends a vectorized input signal to fan-out circuit block 402, which is received at input port 406a. The vectorized input signal is a combination of input signals from each processing element. The vectorized input signal is forwarded to output ports 408a and 410a. Output port 408a may forward the vectorized input signal to multiplexer 405 and output port 410a may forward the vectorized input signal to selector 404. Selector 404 and multiplexer 405 may assert the appropriate vectorized output lines to connect input component 406 to output components 408 and 410, respectively. Vectorized output lines are a combination of control signal lines for each memory block in each of the memory arrays.

FIGS. 5A, 5B, 5C, and 5D illustrate exemplary fan-out circuit block 402 implementations in accordance with various embodiments of the present invention. For the purpose of illustrating clear examples, FIGS. 5A, 5B, 5C, and 5D will be discussed in reference to fan-out circuit block 402 of FIG. 4.

After the various input components of integrated circuit 100 are connected to the various output components of integrated circuit 100 using fan-out circuit block 402 during place and route design step 220 in FIG. 2, a circuit design is generated. The circuit design may be the final circuit design or it may be a simulation. In the circuit design, each of the fan-out circuit blocks used to connect the various components of integrated circuit 100 are replaced by connection components according to certain parameters or a set of parameters. These connecting components may be connecting wires or registers or a combination thereof. The set of parameters may include an implementation platform, a maximum number of user-specified outputs allowed for the input, a latency value, and the number of outputs or a combination thereof. Furthermore, the set of parameters may also include power consumption, delay minimization, and clock frequency optimization or a combination thereof. In an embodiment, the set of parameters may also include other parameters received from the user. The parameters may influence each other and the implementation or replacement of fan-out circuit block 402. For example, an implementation platform may refer to the type of integrated circuit 100 that is being designed by the EDA tool of FIG. 2. The clock frequency optimization constraints for a FPGA with a processing circuit operating at 300 MHz may be different than a SoC with a processing circuit operating at 500 MHz. Similarly, the choice of replacing fan-out circuit block 402 with appropriate connection components may depend upon the maximum fan-out or maximum number of connections to output components per input components allowed under an implementation platform.

Persons having ordinary skill in the art would appreciate that several other well-known parameters utilized during place and route design step 220 in FIG. 2 may also be used to pick the appropriate combination of well-known connection components to implement or replace fan-out circuit block 402.

Figure 5A:
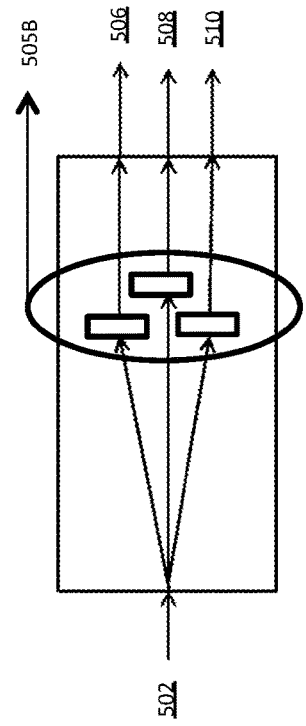
FIGS. 5A, 5B, 5C, and 5D illustrate exemplary fan-out circuit block implementations in accordance with various embodiments of the present invention.

Referring now to FIG. 5A, input component 502 is connected to output components 506, 508, and 510 via connecting wires 505A. In an embodiment, connecting wires 505A may be similar to interconnect circuitry 106 described above. In an embodiment, connecting wires 505A may be replacing one or more fan-out circuit blocks similar to fan-out circuit block 402 described above according to one or more parameters described above. In an embodiment, the use of connecting wires 505A may be a default implementation or replacement of fan-out circuit block 402.

Figure 5B:
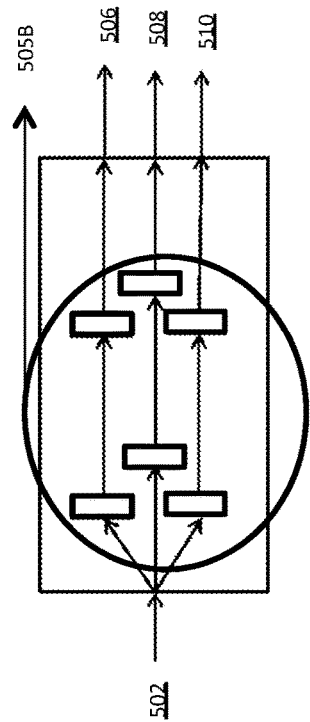
Figure 5C:
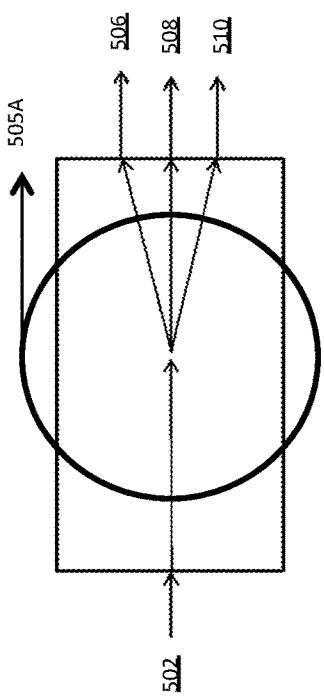
Figure 5D:
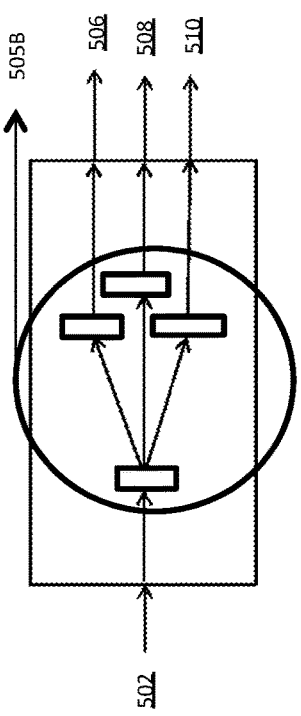

Referring now to FIGS. 5B, 5C, and 5D, input component 502 is connected to output components 506, 508, and 510 via connecting components 505B. In an embodiment, connecting components 505B are a combination of connecting wires and registers or routing registers. In an embodiment, the registers may be woven into an interconnect fabric similar to interconnect circuitry 106 described above. These registers may be available in every interconnect routing segment and at the inputs of all functional blocks. In an embodiment, the registers woven into the interconnect fabric need to be turned on (i.e., initialized) by the EDA tool. In an embodiment, the registers woven into the interconnect fabric that are not turned on are uninitialized. In an embodiment, connecting components 505B may replace one or more fan-out circuit blocks similar to fan-out circuit block 402 described above according to one or more parameters described above. In an embodiment, the number of connecting wires and registers (whether initialized or uninitialized) in connecting components 505B are dependent upon one or more of the parameters described above. For example, the use of extra registers in FIGS. 5C and 5D versus FIG. 5b may indicate a requirement to introduce extra latency in the connection route from input component 502 to the output components to minimize delay for the overall system. Similarly, the EDA tool may select the implementation of fan-out circuit block 402 depicted in FIG. 5A to lower the total wire length used in connecting input component 502 to output components 506, 508, and 510. In an embodiment, one of the implementations of fan-out circuit block 402 illustrated in FIGS. 5B, 5C, and 5D may be a default implementation or replacement of fan-out circuit block 402 according to one or more parameters described above.

Figure 6A:
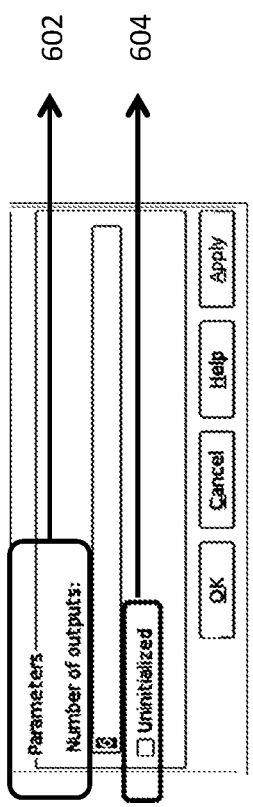
FIGS. 6A and 6B illustrate exemplary graphical user interface (GUI) elements for instantiating fan-out circuit blocks in accordance with an embodiment of the present invention.
Figure 6B:
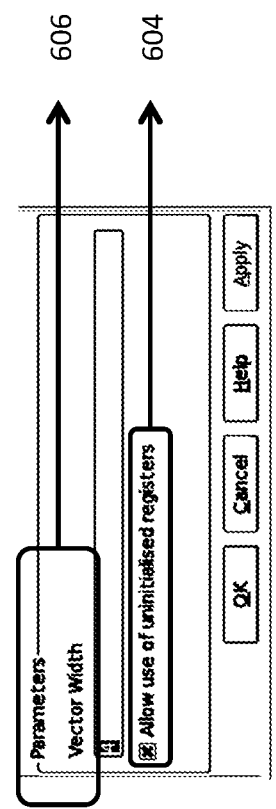

FIGS. 6A and 6B illustrate exemplary graphical user interface (GUI) elements for instantiating fan-out circuit blocks in accordance with an embodiment of the present invention. For the purpose of illustrating clear examples, FIGS. 6A and 6B will be discussed in relation to FIGS. 4, 5A, 5B, 5C, and 5D.

In an embodiment, the process of connecting input component 406 with output components 408 and 410 using fan-out circuit block 402 may involve receiving user input. Because fan-out circuit block 402 hides the processing and implementation details of connecting components in integrated circuit 100, the user input received may be limited to one value or only a few values. The user input may be received by the EDA tool of FIG. 2 via GUI elements (such as text fields, checkboxes, and popups) and displayed to the user. In an embodiment, after the user has input the required values, fan-out circuit block 402 is used to connect input component 406 to the user-specified number of output components. In an embodiment, the number of outputs represents the number of output ports of fan-out circuit block 402. In an embodiment, the specific output components to be connected to input component 406 may be decided by the EDA tool or the user after inserting fan-out circuit block 402.

Referring now to FIG. 6A, a GUI shows a number of outputs text-field 602 for the user to enter the number of output components to be connected to an input component of an integrated circuit. The GUI also displays register initialization checkbox 604 as shown in FIGS. 6A and 6B. Selecting or de-selecting register initialization checkbox 604 may lead to inserting of uninitialized and initialized registers respectively to replace fan-out circuit block 402 in the circuit design.

Referring now to FIG. 6B, a GUI shows vector width text field 606 for output to a vectorized input that the user may enter to determine the number of output components to be connected to input components of an integrated circuit.

FIG. 7 illustrates an exemplary method 700 to connect components in integrated circuit 100 in accordance with an embodiment of the present invention. For the purpose of illustrating clear examples, FIG. 7 will be discussed with reference to FIG. 3 and FIG. 4.

Initially, a circuit designer decides to connect input component 406 to output components 408 and 410. In an embodiment, the circuit designer may decide to connect the components of integrated circuit 100 during or before place and route design step 220 of FIG. 2. In an embodiment, the circuit designer decides to invoke a sub-routine, sub-program, or sub-module of the EDA tool described in FIG. 2 to connect input component 406 to output components 408 and 410 via fan-out block circuit 402. In an embodiment, the circuit designer decides to invoke a sub-routine, sub-program, or sub-module of the EDA tool described in FIG. 2 to connect input component 406 to output components 408 and 410 via fan-out block circuit 402.

At step 702, the EDA tool of FIG. 2 implemented on computer system 300 generates a GUI element to a user-provided value specifying a number of output components to be connected to an input component in the integrated circuit. For example, the EDA tool may use display 312 to display a pop-up window to the circuit designer to obtain the number of output components that may be connected to input component 406. In an embodiment, the GUI element may also receive additional user input concerning the type of connecting components to replace fan-out circuit block 402 in the eventual circuit design. For example, the user may provide input via GUI elements like checkboxes that may determine whether the EDA tool uses initialized or uninitialized registers to replace fan-out circuit block 402. In an embodiment, the EDA tool may receive user input specifying the output components to be connected to input component 406.

At step 704, upon receiving the user provided value, the EDA tool connects input component 406 to each output component of the number of output components in integrated circuit 100 using fan-out circuit block 402. In an embodiment, fan-out circuit block 402 is programmed with a single input port and a number of output ports such that the number of output ports is equal to the user-specified value. For example, the user-specified value may be two. Therefore, fan-out circuit block 402 is programmed with input port 406a and output ports 408a and 410a such that input port 406a receives input signal from input component 406 and output ports 408a and 410a connect to output components 408 and 410 respectively. In an embodiment, output ports 408a and 410a connect to selector 404 or multiplexer 405, which may be connected to output components 408 and 410 respectively.

At step 706, fan-out circuit blocks have been used to connect various input components to various other output components, and the user has completed place and route design step 220 (as described in FIG. 2). In an embodiment, the EDA tool generates a circuit design such that the computer-implemented fan-out circuit block is replaced with connecting components in the circuit design according to a set of parameters. As described above, the set of parameters may include an implementation platform, a maximum number of user-specified outputs allowed for the input, a latency value, and the number of outputs or a combination thereof. Furthermore, the set of parameters may also include power consumption, delay minimization, and clock frequency optimization or a combination thereof. In an embodiment, connecting components may be connecting wires, uninitialized routing registers, or initialized routing registers. In an embodiment, the type and arrangement of connecting components utilized by the EDA tool is determined in part based on the user input. For example, the set of parameters includes an implementation platform (e.g., a SOC operating at 500 MHz), user-input for use of uninitialized routing registers, and other parameters. Based on the set of parameters, the EDA tool decides to connect input component 406 to each of output components 408 and 410 by using connecting wires and three uninitialized routing registers, i.e., similar to the mixed connecting component arrangement illustrated in FIG. 5B.

Step 706 may be followed by additional steps if the circuit designer is not satisfied with the first circuit design generated by the EDA tool. Persons having ordinary skill in the art will appreciate that the circuit designer may rely on their experience, skill, and knowledge to refine the circuit diagram over many iterations. For example, the circuit designer may modify the EDA tool-suggested arrangement of connecting components between two components of the integrated circuit to better satisfy the system design constraints.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims.

What is claimed is:

1. A method of designing an integrated circuit comprising:
   receiving, using a computer-implemented circuit design application, a user-provided value specifying a number of output components to be connected to an input component in the integrated circuit, wherein the input and output components are components of the integrated circuit;
   connecting, using a computer-implemented fan-out circuit block, the input component to each output component of the number of output components in the integrated circuit;
   generating, using the computer-implemented circuit design application, a circuit design, wherein the computer-implemented fan-out circuit block is replaced with connecting components in the circuit design to connect the input component to each of the output components using the connecting components in the integrated circuit according to a set of parameters, and wherein the set of parameters comprises an implementation platform, a maximum number of output components allowed to be connected to the input component, and a latency value; and
   configuring logic and routing paths in the integrated circuit to implement the connecting components connecting the input component to each of the output components using a description of the circuit design.

2. The method as defined in claim 1, wherein the input and output components are programmable logic components formed in a programmable logic device, wherein the connecting components comprise first, second, and third registers, wherein each of the first, second, and third registers is connected to a different one of three of the output components, and wherein each of the first, second, and third registers is connected to the input component.

3. The method as defined in claim 1, wherein the integrated circuit is an application specific integrated circuit, an application-specific standard product, a field-programmable gate array, a complex programmable logic device, or a system-on-chip.

4. The method as defined in claim 1, wherein the user-provided value is a vectorized value comprising a width of an output to the vectorized value.

5. The method as defined in claim 1, wherein replacing the fan-out circuit block with the connecting components further comprises:
   inserting, using the computer-implemented circuit design application, a series of connecting wires between the input component and the each of the output components.

6. The method as defined in claim 1,
   wherein the connecting components comprise first, second, and third registers, wherein each of the first, second, and third registers is connected to a different one of three of the output components, wherein the connecting components further comprise fourth, fifth, and sixth registers, wherein the fourth, fifth, and sixth registers are connected to the first, second, and third registers, respectively, and wherein each of the fourth, fifth, and sixth registers is connected to the input component.

7. The method as defined in claim 6, wherein at least one of the first, second, and third registers is an uninitialized register.

8. The method as defined in claim 1, further comprising:
   receiving, using the computer-implemented circuit design application, a user input specifying connecting the input component to each of the output components using at least one uninitialized register.

9. The method as defined in claim 1, wherein the set of parameters further comprises the number of output components, power consumption by the integrated circuit, delay minimization between the input component and each of the output components, and optimization of a clock frequency of the integrated circuit.

10. A non-transitory computer-readable storage medium storing one or more sequences of instructions, which instructions, when executed by one or more processors, causes the one or more processors to design an integrated circuit by:
receiving a user-provided value specifying a number of output components to be connected to an input component in the integrated circuit using a circuit design application, wherein the input component and the output components are components of the integrated circuit;
connecting the input component to each of the output components of the number of output components in the integrated circuit using a fan-out circuit block;
generating a circuit design using the circuit design application, wherein the fan-out circuit block is replaced with connecting components in the circuit design to connect the input component to each of the output components using the connecting components in the integrated circuit according to a set of parameters, and wherein the set of parameters comprises an implementation platform, a maximum number of output components allowed to be connected to the input component, and a latency value; and
configuring logic and routing paths in the integrated circuit to implement the connecting components connecting the input component to each of the output components using a description of the circuit design.

11. The non-transitory computer-readable storage medium as defined in claim 10, further comprising:
displaying a graphical user interface (GUI) window, wherein the GUI window displays an option to insert a fan-out circuit block.

12. The non-transitory computer-readable storage medium as defined in claim 10, further comprising:
displaying a GUI selection component, wherein the GUI selection component allows specifying connecting the input component to each of the output components using at least one uninitialized register.

13. The non-transitory computer-readable storage medium as defined in claim 10, wherein the fan-out circuit block is implemented by the circuit design application.

14. The non-transitory computer-readable storage medium as defined in claim 10, wherein the user-provided value is a vectorized value comprising a width of an output to the vectorized value.

15. The non-transitory computer-readable storage medium as defined in claim 10, wherein replacing the fan-out circuit block with the connecting components further comprises:
inserting, using the computer-implemented circuit design application, a series of connecting wires between the input component and each of the output components.

16. The non-transitory computer-readable storage medium as defined in claim 10, wherein wherein the connecting components comprise three registers, wherein each of the three registers is connected to a different one of the output components, and each of the three registers is connected to the input component.

17. The non-transitory computer-readable storage medium as defined in claim 16, wherein at least one of the three registers is an uninitialized register.

18. The non-transitory computer-readable storage medium as defined in claim 10 further comprising:
generating a test circuit design using the circuit design application, wherein generating the test circuit design comprises implementing the fan-out circuit block;
accepting user-specified improvements to the test circuit design using the circuit design application, wherein the user-specified improvements comprise re-implementing the fan-out circuit block according to user-understanding of critical paths between the input component and the output components.

19. An integrated circuit comprising:
interconnect circuitry;
programmable logic circuits; and
programmable memory elements, wherein the programmable memory elements store configuration data that configure the interconnect circuitry and the programmable logic circuits to implement a circuit design for the integrated circuit, wherein an input component in the integrated circuit is connected to each of a number of output components in the integrated circuit using connecting components in the interconnect circuitry that are configured according to a description of the circuit design, wherein the connecting components comprise registers and connecting wires, and
wherein a number of the connecting wires and the registers in the connecting components is dependent upon an implementation platform, a maximum number of the output components allowed to be connected to the input component, and a latency value.

20. The integrated circuit as defined in claim 19, wherein the input component is connected to each of the output components using the connecting components in the interconnect circuitry according to the number of output components, power consumption by the integrated circuit, delay minimization between the input component and each of the output components, and optimization of a clock frequency of the integrated circuit.

21. The integrated circuit as defined in claim 19, wherein the connecting components comprise first, second, and third registers, wherein the first, second, and third registers are connected to first, second, and third ones of the output components, respectively, and wherein each of the first, second, and third registers is connected to the input component.

22. The integrated circuit as defined in claim 19, wherein the connecting components comprise first, second, and third registers, wherein the first, second, and third registers are connected to first, second, and third ones of the output components, respectively, wherein the connecting components further comprise a fourth register, wherein each of the first, second, and third registers is connected to the fourth register, and wherein the fourth register is connected to the input component.

* * * * *